US012697908B2

(12) United States Patent
Ziolkowski et al.

(10) Patent No.: US 12,697,908 B2
(45) Date of Patent: Aug. 4, 2026

(54) SEAT ASSEMBLY AND METHOD

(71) Applicant: Lear Corporation, Southfield, MI (US)

(72) Inventors: Steven Ziolkowski, Farmington Hills, MI (US); David J. Abdella, Royal Oak, MI (US); Samuel Blair, Troy, MI (US)

(73) Assignee: Lear Corporation, Southfield, MI (US)

( * ) Notice: Subject to any disclaimer, the term of this patent is extended or adjusted under 35 U.S.C. 154(b) by 259 days.

(21) Appl. No.: 18/544,913

(22) Filed: Dec. 19, 2023

(65) Prior Publication Data

US 2024/0326667 A1 Oct. 3, 2024

Related U.S. Application Data

(60) Provisional application No. 63/493,162, filed on Mar. 30, 2023.

(51) Int. Cl.
*B60N 2/56* (2006.01)
*B60N 2/50* (2006.01)
*B60N 2/90* (2018.01)

(52) U.S. Cl.
CPC *B60N 2/56* (2013.01); *B60N 2/90* (2018.02)

(58) Field of Classification Search
CPC ...... B60N 2/56; B60N 2/0024; B60N 2/0035; B60N 2/5628; A47C 7/74
See application file for complete search history.

(56) References Cited

U.S. PATENT DOCUMENTS

| | | | | |
|---|---|---|---|---|
| 6,476,514 B1 * | 11/2002 | Schondorf | ........ | B60R 21/01516 701/45 |
| 9,511,646 B2 * | 12/2016 | Müller | .................... | G01N 19/10 |
| 12,017,567 B2 * | 6/2024 | Greenwood | ......... | B60N 2/7094 |
| 12,017,568 B2 * | 6/2024 | Pacilli | .................. | B60N 2/5642 |
| 2001/0045733 A1 * | 11/2001 | Stanley | ................ | H03K 17/955 180/273 |
| 2005/0173950 A1 * | 8/2005 | Bajic | ......................... | A47C 7/74 297/452.45 |
| 2007/0158981 A1 * | 7/2007 | Almasi | ................ | B60N 2/5621 297/180.12 |
| 2008/0054609 A1 * | 3/2008 | Yamanaka | ........... | B60N 2/0034 280/735 |
| 2009/0218855 A1 * | 9/2009 | Wolas | ...................... | A47C 7/74 297/180.12 |
| 2015/0239321 A1 * | 8/2015 | Muller | ............... | B60H 1/00792 297/217.2 |
| 2016/0257272 A1 * | 9/2016 | Ruthinowski | ..... | B60R 21/01546 |
| 2024/0326667 A1 * | 10/2024 | Ziolkowski | .............. | B60N 2/56 |

FOREIGN PATENT DOCUMENTS

| | | |
|---|---|---|
| JP | 2013111987 A | 6/2013 |
| JP | 2020189510 A | 11/2020 |

* cited by examiner

*Primary Examiner* — Shin H Kim
(74) *Attorney, Agent, or Firm* — McGarry Bair PC

(57) ABSTRACT

A seat assembly includes a seat, a fan disposed at least partially in the seat to ventilate the seat, a sensor configured to sense if a portion of an occupant is adjacent a surface of the seat, and an electronic controller connected to the fan and the sensor. The electronic controller can control a speed of the fan according to an output from the sensor.

19 Claims, 6 Drawing Sheets

SEAT ASSEMBLY AND METHOD

CROSS-REFERENCE TO RELATED APPLICATIONS

This application claims the benefit of and priority to U.S. Provisional Application 63/493,162 filed Mar. 30, 2023, the disclosure of which is hereby incorporated by reference in its entirety as though fully set forth herein.

TECHNICAL FIELD

The present disclosure generally relates to seat assemblies, including seat assemblies that may be utilized in connection with vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
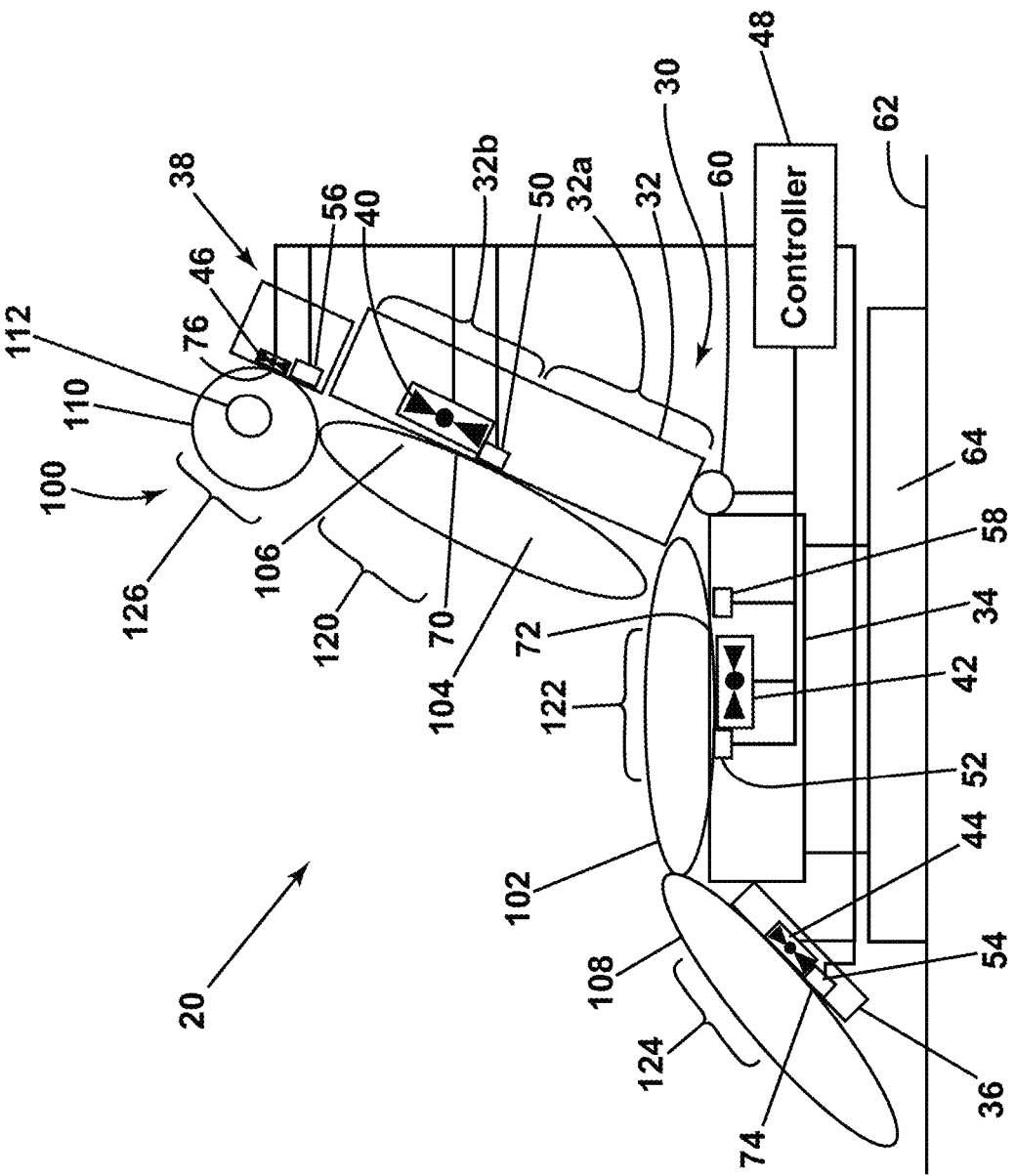
FIG. 1 is a schematic view generally illustrating an embodiment of a seat assembly, with an occupant in a design position, according to teachings of the present disclosure.

Referring to FIG. 1, a seat assembly 20 comprises a seat 30 including a seat back 32, a seat base 34, a seat extension 36, a headrest 38, one or more fans 40-46, a controller 48 (e.g., an electronic controller), one or more sensors 50-56, and/or an occupancy sensor 58. The controller 48 is connected to the one or more fans 40-46, the one or more sensors 50-56, and/or the occupancy sensor 58. The seat assembly 20 may be used, for example and without limitation, in conjunction with a passenger vehicle (e.g., an automobile, van, SUV, truck, bus, train, boat, airplane, etc.) and in any other situation or device where seating is desired, such as a home, office building, warehouse facility, theater, gym, recreational vehicle, commercial vehicle/equipment, agricultural vehicle/equipment, and/or roller coaster, etc.

The seat back 32, the seat base 34, the seat extension 36, and/or the headrest 38 are connected together and can be configured to move relative to each other, such as manually and/or via one or more seat actuators 60 (e.g., electric motors). The seat 30 is connectable to a mounting surface 62, such as via a track assembly 64. An occupant 100 can utilize the seat 30 by sitting with their upper legs 102 on the seat base 34, leaning their back 104, which can include shoulders 106, against the seat back 32, resting their lower legs 108 on the seat extension 36, and/or resting their head 110 against the headrest 38. The occupant 100 has ears 112 that move with their head 110.

In a design position, such as generally illustrated in FIG. 1, a first portion 120 of the occupant 100 is adjacent a surface 70 of the seat back 32, a second portion 122 of the occupant 100 is adjacent a surface 72 of the seat base 34, a third portion 124 of the occupant 100 is adjacent a surface 74 of the seat extension 36, and/or a fourth portion 126 of the occupant 100 is adjacent a surface 76 of the headrest 38. The first portion 120 can include parts of the back 104 and/or shoulders 106 of the occupant 100. The second portion 122 can include parts of the upper legs 102 of the occupant 100, which can include hips, buttocks, and/or thighs. The third portion 124 can include parts of the lower legs 108 of the occupant 100. The fourth portion 126 can include parts of the head 110 of the occupant 100.

Figure 2:
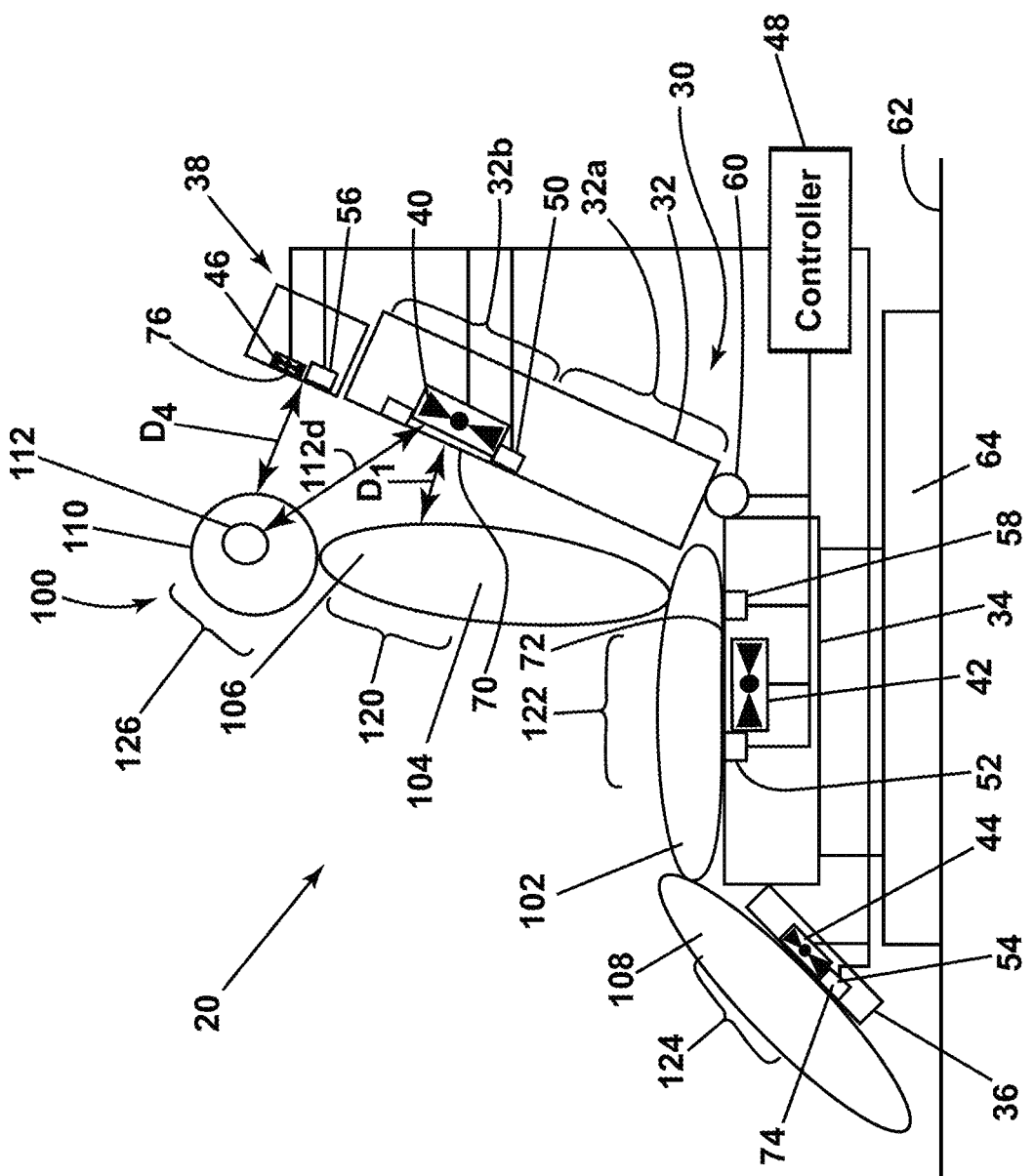
FIGS. 2-5 are schematic views generally illustrating an embodiment of a seat assembly, with an occupant in various alternate positions, according to teachings of the present disclosure.
Figure 3:
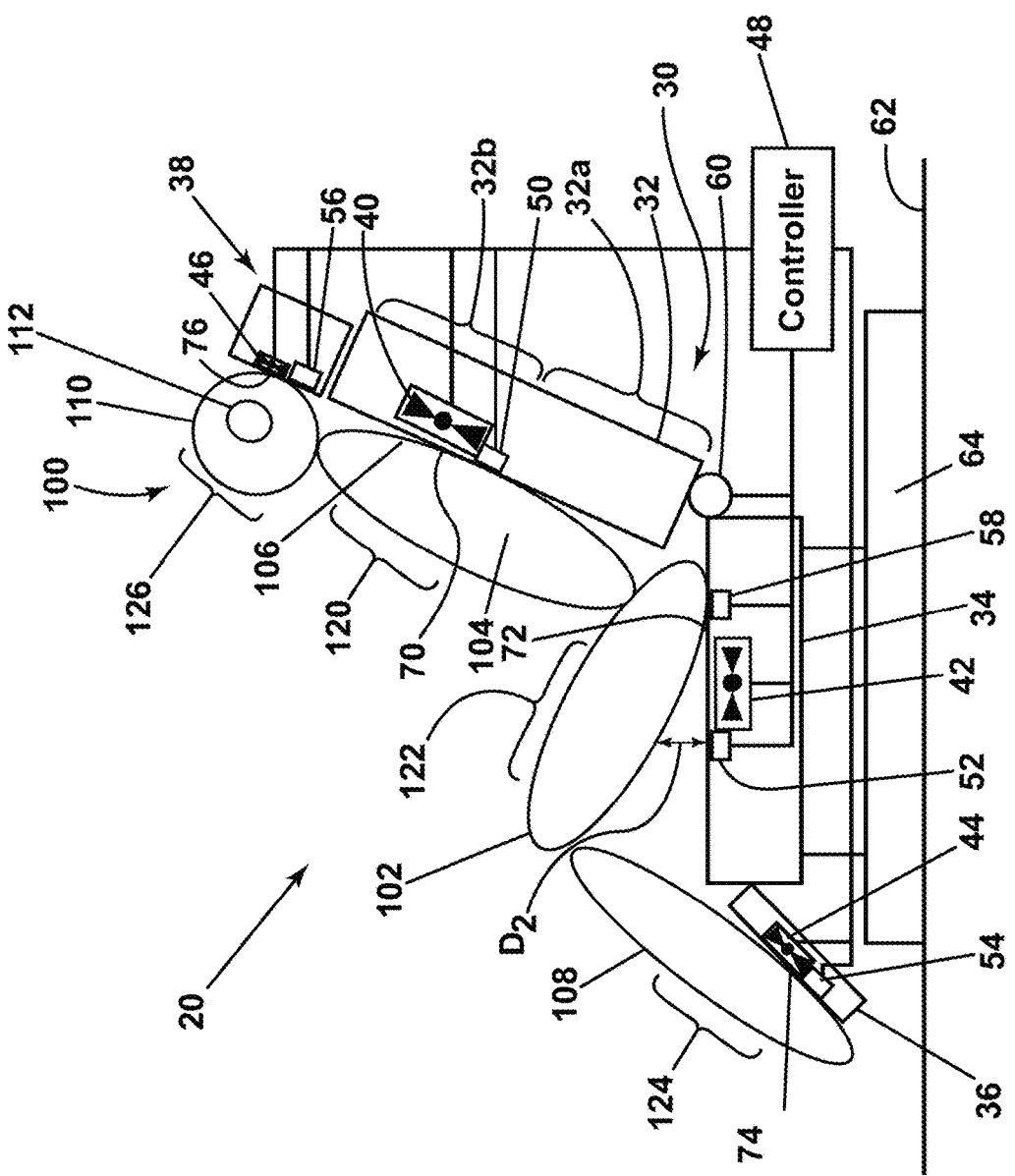
Figure 4:
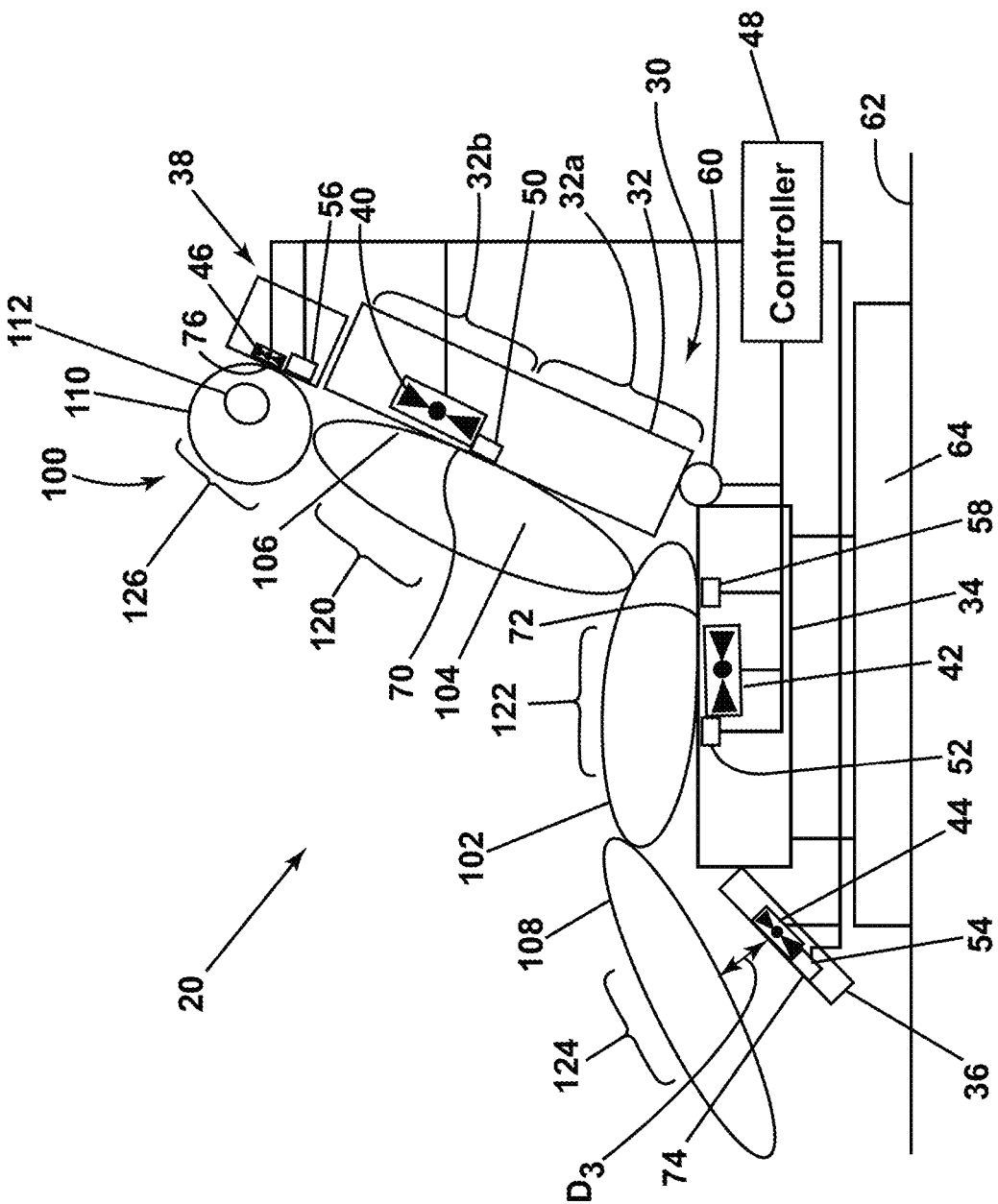
Figure 5:
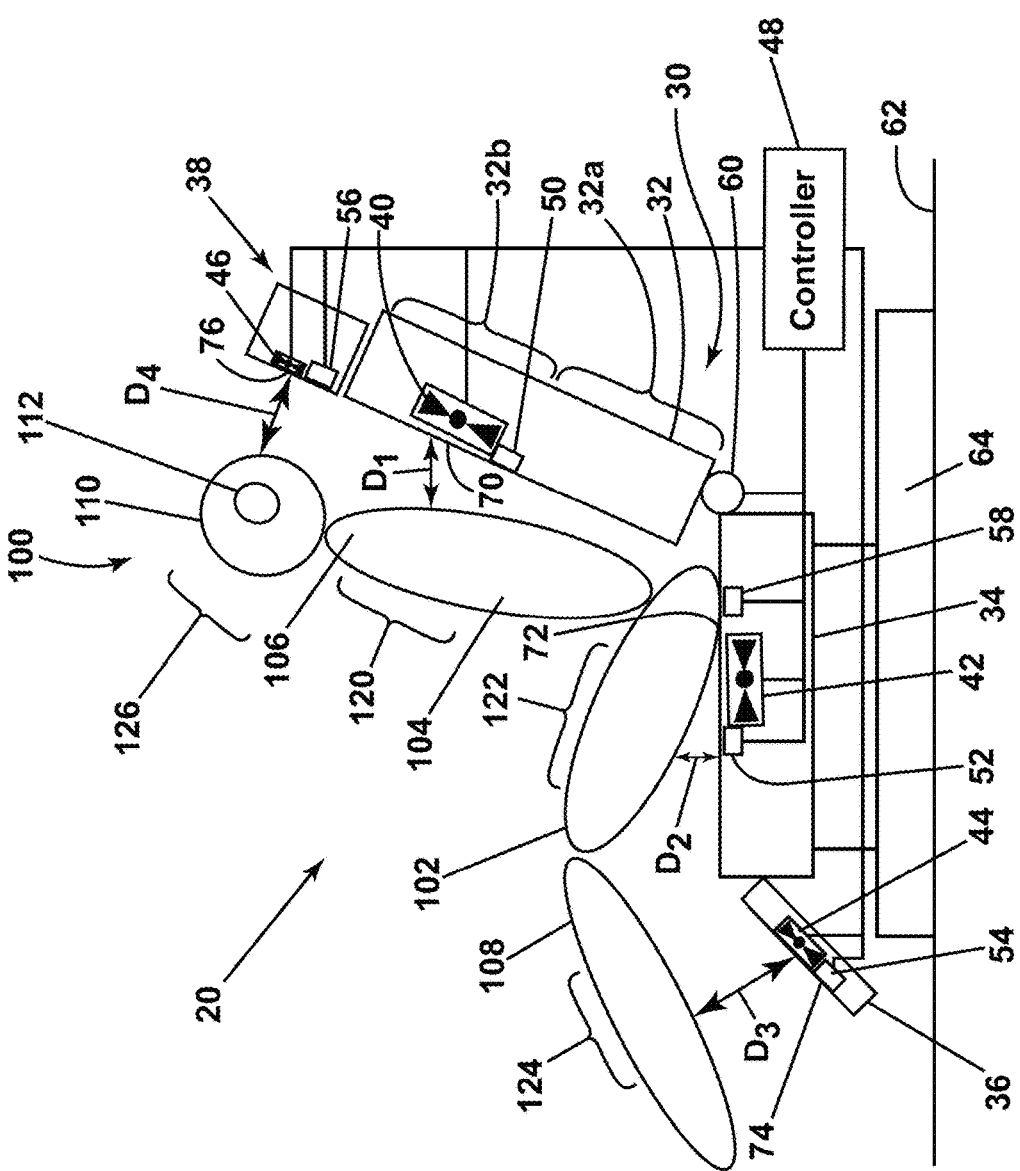

Examples of an occupant 100 that has moved out of the design position and into alternate positions are illustrated in FIGS. 2-5. The occupant 100 moves out of the design position in one or more of a variety of circumstances, such as to adjust an infotainment system, reach for an object not in their immediate vicinity, stretch, and/or talk to other occupants, among other circumstances. In the alternate positions, one or more portions 120-126 of the occupant 100 are not adjacent respective surfaces 70-76 of the seat 30. For example, in a first alternate position, the first portion 120 of the occupant 100 is not adjacent the surface 70 of the seat back 32 and the fourth portion 126 of the occupant 100 is not adjacent the surface 76 of the headrest 38, such as generally shown in FIG. 2. In a second alternate position, the second portion 122 of the occupant 100 is not adjacent the surface 72 of the seat base 34, such as shown in FIG. 3. In a third alternate position, the third portion 124 of the occupant 100 is not adjacent the surface 74 of the seat extension 36, such as generally shown in FIG. 4). Other alternate positions can include various combinations of portions 120-126 not adjacent respective surfaces 70-76. For example, FIG. 5 shows an alternate position in which none of portions 120-126 are adjacent surfaces 70-76.

With embodiments, a portion 120-126 of an occupant 100 may be adjacent a surface 70-76 if the portion 120-126 (or clothing/covering thereof) is in contact with and/or applying a force to the surface 70-76, or a corresponding separation distance $D_{1-4}$ between a portion 120-126 and a surface 70-76 is less than a distance threshold. The separation distance $D_{1-4}$ may be determined via a sensor 50-56. The distance threshold may, for example and without limitation, be 1 inch, 0.5 inches, 0.1 inches or other values. In some other embodiments, a portion 120-126 of an occupant 100 may only be adjacent a surface 70-76 if the portion 120-126 (or clothing/covering thereof) is in contact with and/or applying a force to the surface 70-76 (e.g., the separation distance $D_{1-4}$ is zero).

In FIGS. 1-5, the seat 30 includes one or more fans 40-46, such as a first fan 40 disposed at least partially in the seat back 32, a second fan 42 disposed at least partially in the seat base 34, a third fan 44 disposed at least partially in the seat extension 36, and/or a fourth fan 46 disposed at least partially in the headrest 38. The fans 40-46 ventilate the surfaces 70-76, such as to provide improved comfort to the occupant 100. The fans 40-46 can operate at a plurality of speeds that can be controlled by the controller 48 and/or by the occupant 100. The fans 40-46 generate sound (e.g., wind noise, motor noise, etc.) that varies depending on speed. In some configurations, the fans 40-46 are electric fans with axial or radial inlets and axial or radial outlets. The fans 40-46 operate in a first direction to pull air through the seat 30 and provide that air to the surfaces 70-76. Additionally or alternatively, the fans 40-46 operate in a second direction to draw air through the surfaces 70-76.

While embodiments are shown with four fans 40-46, embodiments of the present disclosure are not limited to configurations with four fans. For example, with some embodiments, the seat 30 includes one fan in each of the seat back 32 and the seat base 34 (e.g., fans 40, 42) and does not include fans in the seat extension 36, if the seat 30 includes a seat extension 36, or in the headrest 38. In other embodiments, one or more of the seat back 32, the seat base 34, the seat extension 36, and/or the headrest 38 includes multiple fans that can operate together or independently.

The one or more fans 40-46 can be disposed behind and/or be at least partially aligned with a respective surface 70-76 of the seat 30. For example, in a design position, respective portions 120-126 of the occupant 100, surfaces 70-76, and fans 40-46 can overlap in a direction perpendicular to the surface 70-76.

In FIGS. 1-5, a first fan 40 is disposed in an upper half 32*b* of the seat back 32 (e.g., relative to vertical when the seat back 32 is in a vertical/upright position). A lower half 32*a* of the seat back 32 can include other components, such as lumbar support components and/or recliners/motors. The first fan 40 may be proximate the ears 112 of the occupant 100 when the occupant 100 is in the design position and/or when the occupant 100 is in an alternate position, so the amount of sound generated by the first fan 40 may be particularly noticeable to the occupant 100, such as compared to fans or other components that are disposed farther from the ears 112 of the occupant 100. In some instances, when an occupant 100 is in the design position, an expected position of the ears 112 of the occupant 100 may be within 18 inches or less of the first fan 40 (see distance 112*d* in FIG. 1). Even in some alternate positions (see, e.g., FIG. 2), the distance 112*d* may be less than if the fan 40 was disposed in the lower half 32*a* of the seat back 32.

The seat 30 includes one or more sensors 50-56 configured to sense whether a portion 120-126 of an occupant 100 is adjacent a respective surface 70-76 of the seat 30. For example, a first sensor 50 senses whether a first portion 120 of the occupant 100 is adjacent the surface 70 of the seat back 32, a second sensor 52 senses whether a second portion 122 of the occupant 100 is adjacent the surface 72 of the seat base 34, a third sensor 54 senses whether a third portion 124 of the occupant 100 is adjacent the surface 74 of the seat extension 36, and/or a fourth sensor 56 senses whether a fourth portion 126 of the occupant 100 is adjacent the surface 76 of the headrest 38. The sensors 50-56 can include one or more of a variety of configurations. For example, the sensors 50-56 can include sensors disposed in the seat 30 (e.g., pressure sensors, weight sensors, resistive sensors, capacitive sensors, fluid pressure sensors connected to fluid bladders in the seat 30, microphones, cameras, light sensors, lasers, limit switches, radar sensors, others) and/or sensors disposed outside of the seat 30 (e.g., cameras, microphones, lasers, radar sensors, light sensors, others). In some configurations, a sensor 50-56 can include a printed resistive sensor disposed under the surface 70-76 of the seat 30 and can sense the pressure (e.g., force, weight, light sensors, etc.) of the occupant 100 against the seat 30.

In some configurations, the surfaces 70-76 may comprise less than a total surface of a respective part 32-38 of the seat 30. For example, the surface 70 of the seat back 32 may comprise half (e.g., a top half) or less of a total surface of the seat back 32. The size of the surfaces 70-76 may correspond to the size of the fan 40-46. For example, the surfaces 70-76 may have a surface area that is approximately the same as or larger than the fan 40-46 and less than the total surface area of the seat part 32-38. The fan 40-46 can be disposed such that the surface 70-76 covers, at least in directly, the fan 40-46 in a direction perpendicular to the surface 70-76. The fan 40-46 and/or the surface 70-76 can be at least partially aligned with an expected position of a portion 120-126 of an occupant 100 in the design position (see FIG. 1). For example, the first fan 40 and the surface 70 may be at least partially aligned with an expected position of the shoulders 106 of the occupant 100, which may result in the shoulders 106 of the occupant 100 directly covering some or all of the surface 70 and indirectly covering (e.g., with the surface 70 and/or other material or gaps in between) some or all of the first fan 40 when the occupant 100 is in the design position.

The positions of the one or more sensors 50-56 correspond to the positions of the fans 40-46 and the surfaces 70-76, and/or expected positions of portions 120-126 of the occupant 100. For example, for sensors 50-56 (or portions thereof) disposed in the seat 30, the sensors 50-56 may be proximate and/or in contact with an inner side of the surfaces 70-76. Additionally or alternatively, the sensors 50-56 may be disposed at least partially between the one or more fans 40-46 and a corresponding surface 70-76, and/or may be disposed adjacent the one or more fans 40-46. In one example configuration, the position of the first sensor 50 corresponds to (e.g., is aligned with, directed at, etc.) an expected position of the shoulders 106 of the occupant 100 in the design position, which is aligned with the first fan 40 and the surface 70.

As shown in FIGS. 1-5, the seat 30 includes an occupancy sensor 58 configured to sense if an occupant 100 is occupying the seat 30. The occupancy sensor 58 can be separate and independent from the sensors 50-56. The occupancy sensor 58 can include one or more of a variety of configurations. For example, the occupancy sensor 58 can include one or more sensors disposed in the seat 30 (e.g., pressure sensors, weight sensors, resistive sensors, capacitive sensors, fluid pressure sensors connected to fluid bladders in the seat 30, microphones, light sensors, lasers, limit switches, radar sensors, others) and/or one or more sensors disposed outside of the seat 30 (e.g., cameras, microphones, radar sensors, lasers, others).

In some instances, the occupancy sensor 58 may be disposed to sense that the occupant 100 is occupying the seat 30 even if some or all portions 120-126 are not adjacent to the surfaces 70-76. For example, if the occupancy sensor 58 or a part thereof is configured to sense occupancy at a rear of the seat base 34 (e.g., via a sensor portion at the rear of the seat base 34, via a camera, among others), the occupancy sensor 58 may still sense that the occupant 100 is occupying the seat 30 in each of the alternate positions shown in FIGS. 2-5.

The controller 48 is connected (e.g., via wired and/or wireless connection) with the one or more fans 40-46, the one or more sensors 50-56, and/or the occupancy sensor 58. The controller 48 receives information about the seat 30 and/or the occupant 100 via output from the one or more sensors 50-56 and/or the occupancy sensor 58. The controller 48 uses the output information to determine the status of the seat 30 and/or the occupant 100, and uses that status to control operation of the one or more fans 40-46. The controller 48 can be integrated with the seat 30 and/or can be disposed in a remote location, which could include another part of a vehicle, for vehicle applications. For example and without limitation, in some configurations, the controller 48 is provided as and/or includes a vehicle controller configured to control one or more other components of a vehicle (e.g., propulsion, braking, charging, other fans, other seats, among others). The controller 48 can be connected to one or more actuators 60 to control movement of the seat 30, the seat back 32, the seat base 34, the seat extension 36, and/or the headrest 38.

Figure 6:
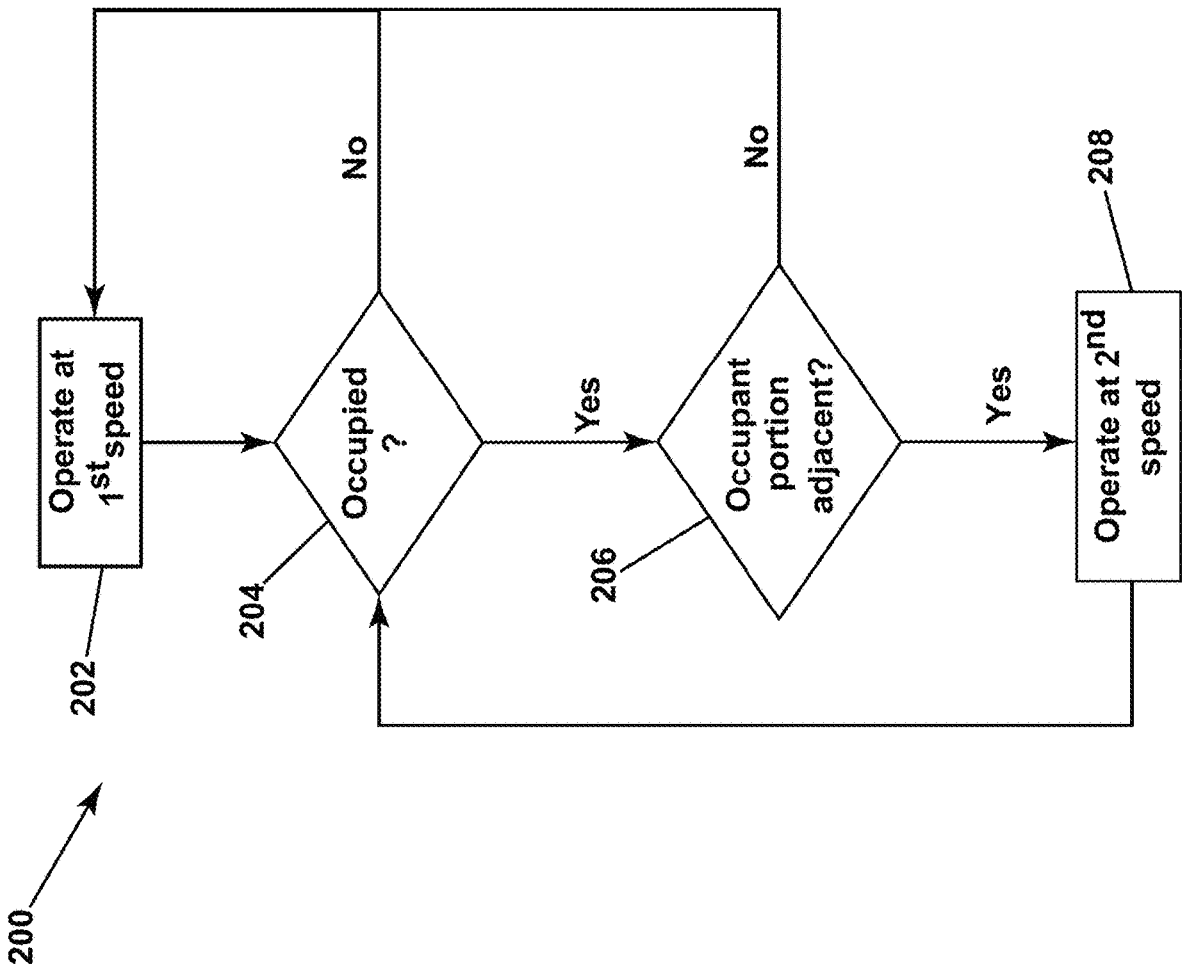
FIG. 6 is a flow diagram generally illustrating an embodiment of a method of operating a seat assembly according to teachings of the present disclosure.

A method 200 of operating a seat assembly 20 is illustrated in FIG. 6. The method 200 includes operating one or more fans 40-46 at a first speed (block 202), such as to ventilate the seat 30. The method 200 can include the controller 48 determining if the seat 30 is occupied (block 204), such as via an occupancy sensor 58. If the seat 30 is not occupied, the controller 48 continues operating one or more fans 40-46 at the first speed (block 202). If the seat 30 is occupied, the controller 48 determines if one or more portions 120-126 of an occupant 100 are adjacent to a corresponding surface 70-76 of the seat 30 (block 206), such as via one or more sensor 50-56. For example, block 206 may include sensing via one or more sensors 50-56 whether a portion 120-126 of the occupant 100 is adjacent the surface 70-76. In accordance with sensing and/or determining that all of the one or more portions 120-126 are adjacent to a corresponding surface 70-76, the controller 48 operates the one or more fans 40-46 at a second speed (block 208), with the second speed being faster than the first speed.

The one or more fans 40-46 are disposed such that when a portion 120-126 of an occupant 100 is adjacent a corresponding surface 70-76, the portion 120-126 of the occupant 100 limits (e.g., muffles, reduces, absorbs, etc.) at least some of the sound generated by the respective fan 40-46. For example, the fan 40-46 may be at least partially aligned under the surface 70-76 and may generate sound at a first sound level when operating at the first speed, and the fan 40-46 may generate sound at a second sound level when operating at the second speed. When a portion 120-126 of the occupant 100 is adjacent the corresponding surface 70-76, the portion 120-126 may overlap with the fan 40-46 and may reduce and/or limit the sound associated with the fan 40-46 to a reduced sound level. The reduced sound level is lower than the first sound level if the fan 40-46 is operating at the first speed and lower than the second sound level if the fan 40-46 is operating at the second speed. The reduced sound level associated with the fan 40-46 operating at the second speed can be similar to the first sound level.

In accordance with determining that any of the one or more portions 120-126 are not adjacent to a corresponding surface 70-76, the controller 48 operates the fan(s) 40-46 associated with the corresponding non-adjacent portion 120-126 at the first speed (block 202) that corresponds to the reduced sound level. For example, if the controller 48 determines that a first portion 120 of the occupant 100 is not adjacent the surface 70 of the seat back 32, the controller 48 operates the first fan 40 at the first fan first speed, which can include continuing to operate the first fan 40 at the first fan first speed or changing (e.g., reducing) the speed of the first fan 40 from the a first fan second speed to the first fan first speed. If the controller 48 determines that a second portion 122 of the occupant 100 is not adjacent the surface 72 of the seat base 34, the controller 48 operates the second fan 42 at a second fan first speed, which can include continuing to operate the second fan 42 at the second fan first speed or changing (e.g., reducing) the speed of the second fan 42 from a second fan second speed to the second fan first speed. If the controller 48 determines that a third portion 124 of the occupant 100 is not adjacent the surface 74 of the seat extension 36, the controller 48 operates the third fan 44 at a third fan first speed, which can include continuing to operate the third fan 44 at the third fan first speed or changing (e.g., reducing) the speed of the third fan 44 from a third fan second speed to the third fan first speed. If the controller 48 determines that a fourth portion 126 of the occupant 100 is not adjacent the surface 76 of the headrest 38, the controller 48 operates the fourth fan 46 at a fourth fan first speed, which can include continuing to operate the fourth fan 46 at the fourth fan first speed or changing (e.g., reducing) the speed of the fourth fan 46 from a fourth fan second speed to the fourth fan first speed.

The first, second, third, and fourth fan first and second speeds may or may not be the same. For example, the first fan second speed may be different than the third fan second speed. For each fan 40-46, the first speed is slower than the second speed, but the first speed of any particular fan 40-46 may be faster than the second speed of another fan 40-46.

The method 200 may return to block 204 or block 206 to determine if the seat 30 is still occupied and/or if a non-adjacent portion 120-126 is once again adjacent to the respective surface 70-76. In accordance with the controller 48 determining that the occupant 100 has moved such that the non-adjacent portion(s) 120-126 is once again adjacent to the respective surface 70-76 (block 206), the method 200 proceeds to block 208 and the controller 48 operates the respective fan(s) 40-46 at the second speed.

The first speed for each fan 40-46 corresponds to the second speed for the fan 40-46 and/or the reduced sound level associated with the fan 40-46 operating at the second speed and covered by a portion 120-126 of the occupant 100. For example, the first speeds may be configured to result in the sound level associated with the fan 40-46 (e.g., heard by the ears 112 of the occupant 100) being the same or within a threshold amount of the reduced sound level associated with the fan 40-46 when the fan 40-46 is operating at the second speed and the corresponding portion(s) 120-126 of the occupant 100 is adjacent the surface(s) 70-76 of the seat 30. For example, the first fan speeds can mimic or simulate the sound from the fan 40-46 heard by the occupant 100 when the respective portion 120-126 of the occupant 100 is adjacent the surface 70-76 that covers the fan 40-46. The threshold may, for example and without limitation, be 10% or less or 5% or less (or other values). Operating a fan 40-46 at a first speed may limit sound from the fan 40-46 to within the threshold or to the reduced sound level.

With some embodiments, the sensors 50-56 can provide variable outputs corresponding to the amount of force and/or pressure applied by a portion 120-126 of an occupant 100 to a surface 70-76. The controller 48 may control the speed of a fan 40-46 according to the amount of force and/or pressure sensed by a sensor 50-56. For example, the controller 48 may reduce fan speeds from a second speed as force and/or pressure from a portion 120-126 decreases, and/or may increase fan speeds toward the first speed as force and/or pressure from a portion 120-126 increases. In some instances, reduced force and/or pressure may precede a portion 120-126 transitioning to a non-adjacent position, so the controller 48 can start reducing fan speed toward the first speed while the portion 120-126 is still adjacent the surface 70-76, which can reduce a change in fan speed from a current speed to the first speed when the portion 120-126 becomes non-adjacent (e.g., improve response time). For example, the controller 48 may control the speed of a fan 40-46 as a function of (e.g., proportionally with) the force and/or pressure sensed via a sensor 50-56. In some configurations, the second fan speeds correspond to a maximum force/pressure, and the first fan speeds correspond to zero force/pressure.

With some embodiments, the controller 48 is configured to operate one or more fans 40-46 at a plurality of second speeds when the occupant 100 is occupying the seat 30 and a respective portion 120-126 of the occupant 100 is adjacent the surface 70-76 of the seat 30 (block 202). The controller 48 can also be configured to operate the one or more fans 40-46 at a plurality of first speeds when the occupant 100 is occupying the seat 30 and a respective portion 120-126 of the occupant 100 is not adjacent the surface 70-76 of the seat 30 (block 202). The plurality of first speeds each correspond to one of the second speeds to maintain sound levels associated with the fan 40-46 when said portion 120-126 of the occupant 100 is adjacent the surface 70-76 and when the portion 120-126 of the occupant 100 is not adjacent the surface 70-76. For example, operating the one or more fans 40-46 at the first and second speeds (blocks 202 and 208) may comprise the controller 48 operating the one or more fans 40-46 according to output(s) from the one or more sensors 50-56 to maintain a sound level within a sound range when a portion 120-126 of the occupant 100 is adjacent the surface 70-76 and when the portion 120-126 of the occupant 100 is not adjacent the surface 70-76. The sound range may, for example, comprise sounds levels that are different from each other by amounts that are not perceptible or are barely perceptible to the human ear.

In embodiments with multiple fans 40-46, the controller 48 can be configured to independently operate the fans 40-46, including operating one or more fans 40-46 at first speeds and one or more other fans 40-46 at second speeds (e.g., simultaneously). For example, if the controller 48 determines that the first portion 120 of the occupant 100 is not adjacent the surface 70 and that the second portion 122 of the occupant 100 is adjacent the surface 72, the controller 48 can simultaneously operate the first fan 40 at a first fan first speed and operate the second fan 42 at a second fan second speed. In some configurations, the controller 48 can carry out the method 200 independently and simultaneously for each fan 40-46.

With some embodiments, the first speeds of the fans 40-46 may be stored in and/or accessible by the controller 48 for each second speed of the fans 40-46. Additionally or alternatively, the controller 48 may apply a speed factor (e.g., between 0 and 1) to the first speeds to determine the second speeds. Additionally or alternatively, the controller 48 may receive output from a sensor 50-56 (e.g., a microphone) of the reduced sound level of the fan 40-46 with an adjacent portion 120-126 and determine the first speeds by reducing the speed of a fan 40-46 from the second speed until the sound level is at or below the reduced sound level when the portion 120-126 is not adjacent to the surface 70-76 (e.g., a level sensed by the microphone when the occupant 100 was in the design position).

Embodiments of the present disclosure may be configured to limit significant changes in sound levels heard by an occupant 100 of a seat 30. For example, an occupant 100 moving from a design position to an alternate position may remove the sound limiting effect of the occupant's body on one or more fans 40-46, but the controller 48 may reduce the speed of the one or more fans 40-46 to compensate for the removal of the sound limiting effect, and the occupant 100 may be exposed to only minimal or zero increases in sound levels. This compensation may be particularly useful for configurations in which a fan (e.g., the first fan 40) is disposed in an upper half 32*b* of a seat back 32 and/or in which a fan (e.g., the fourth fan 46) is disposed in a headrest 38, which may involve the ears 112 of an occupant 100 being closer to the fan than with other configurations.

With some embodiments, the method 200 may start with the controller 48 receiving a request or instruction to turn on one or more fans 40-46 at the first speed. The request or instruction can be from another component and/or from an occupant 100 interacting with a user interface. Additionally or alternatively, the controller 48 may start operating one or more fans 40-46 at the first speed (block 202) in accordance with the controller 48 determining that one or more conditions are met (e.g., ambient temperature is above a threshold temperature). If the controller 48 is operating a fan 40-46 at a first speed, and the controller 48 determines that a different first speed would be applied if the respective portion 120-126 was adjacent the respective surface 70-76 (e.g., the occupant 100 provides different input, ambient temperature changes significantly, etc.), the controller 48 may adjust the first speed so that when the portion 120-126 returns to an adjacent position and the controller 48 changes fan 40-46 to a second speed that is faster or slower than the original second speed, the sound level does not increase or decrease significantly.

In some embodiments, the controller 48 only controls the speed of a fan 40-46 according to output from a sensor 50-56 (e.g., to maintain sound levels) when a seat 30 is occupied. For example, if a seat 30 is not occupied, the controller 48 may still operate a fan 40-46 to ventilate a seat 30 (e.g., to precondition the seat 30 in hot environments), but may not use information from the sensors 50-56 to switch the fan 40-46 to a second speed.

While embodiments of the method 200 are described that include determining whether the seat 30 is occupied (block 204), other embodiments may not include that determination, and/or may conduct blocks 206 and/or 208 any time (e.g., periodically, continuously, etc.) a fan 40-46 is active.

In some embodiments, the method 200 may start with block 204 or block 206 instead of block 202. For example, the method 200 may start with the controller 48 determining if the seat 30 is occupied and/or if the occupant 100 is adjacent surfaces 70-76 of the seat 30 before starting to operate one or more fans 40-46 at first speeds (block 202) or second speeds (block 208).

The present disclosure includes the following non-limiting embodiments:

1. A seat assembly comprising a seat; a fan disposed at least partially in the seat to ventilate the seat; a sensor configured to sense if a portion of an occupant is adjacent a surface of the seat; and an electronic controller connected to the fan and the sensor; wherein the electronic controller controls a speed of the fan according to an output from the sensor.

2. The seat assembly of any preceding embodiment, wherein the sensor comprises a printed resistive sensor disposed under the surface of the seat and senses pressure of said portion of said occupant against the seat; and the controller controls the speed of the fan as a function of the sensed pressure.

3. The seat assembly of any preceding embodiment, wherein, in accordance with determining that said portion is not adjacent the surface, the electronic controller operates the fan at a first speed; in accordance with determining that said portion is adjacent the surface, the electronic controller operates the fan at a second speed; and the first speed is slower than the second speed.

4. The seat assembly of any preceding embodiment, wherein, when said portion of said occupant is adjacent the surface and the fan operates at the second speed, said portion of said occupant limits sound associated with the fan to a sound level; and in accordance with determining that said portion is not adjacent the surface, the electronic controller operates the fan at the first speed to limit sound associated with the fan to within a threshold of the sound level.

5. The seat assembly of any preceding embodiment, wherein the electronic controller controls the speed of the fan according to the output from the sensor to maintain a sound level associated with the fan within a sound range when said portion of said occupant is adjacent the surface and when said portion of said occupant is not adjacent said surface.

6. The seat assembly of any preceding embodiment, wherein the fan generates sound at a first sound level when operating at a first speed; the fan generates sound at a second sound level when operating at a second speed; when said portion of said occupant is adjacent the surface and the fan is operating at the second speed, said portion of said occupant limits the sound generated by the fan to a reduced sound level that is lower than the second sound level; the first speed is slower than the second speed; the first sound level corresponds to the reduced sound level; and in accordance with determining that said portion is adjacent the surface, the electronic controller switches the fan from operating at the first speed to operating at the second speed.

7. The seat assembly of any preceding embodiment, wherein the fan is disposed such that said portion of said occupant muffles and/or absorbs sound from the fan when said portion is adjacent the surface.

8. The seat assembly of any preceding embodiment, wherein the fan is disposed within 18 inches of an expected ear position of said occupant in a design position.

9. The seat assembly of any preceding embodiment, further comprising an occupancy sensor connected to the seat; and the electronic controller only controls the speed of the fan according to the output from the sensor when the seat is occupied.

10. The seat assembly of any preceding embodiment, wherein the sensor comprises a microphone, a camera, and/or a pressure sensor.

11. The seat assembly of any preceding embodiment, wherein the fan is disposed at least partially in a top half of a seat back of the seat.

12. The seat assembly of any preceding embodiment, wherein the fan is disposed behind and at least partially aligned with the surface.

13. The seat assembly of any preceding embodiment, wherein the surface comprises half or less of a total seating surface of the seat back.

14. The seat assembly of any preceding embodiment, wherein a position of the sensor corresponds to an expected position of shoulders of said occupant in a design position.

15. The seat assembly of any preceding embodiment, wherein the electronic controller is configured to operate the fan at a plurality of first speeds when said occupant is occupying the seat and said portion is not adjacent the surface; the electronic controller is configured to operate the fan at a plurality of second speeds when said occupant is occupying the seat and said portion is adjacent the surface; and the plurality of first speeds each correspond to a second speed of the plurality of first speeds to maintain sound levels associated with the fan when said portion of said occupant is adjacent the surface and when said portion of said occupant is not adjacent the surface.

16. The seat assembly of any preceding embodiment, wherein said portion of said occupant includes shoulders; and at least a part of the surface is aligned with an expected position of said shoulders of said occupant in a design position.

17. A method of operating the seat assembly of any preceding embodiment, the method comprising operating the fan to maintain a sound level when said portion of said occupant is adjacent the surface and when said portion of said occupant is not adjacent the surface.

18. A method of operating the seat assembly of any preceding embodiment, the method comprising: operating the fan to ventilate the seat; sensing, via the sensor, whether said portion of said occupant is adjacent the surface; and in accordance with sensing, via the sensor, that said portion of said occupant is not adjacent the surface, operating the fan at a lower speed to maintain a sound level associated with the fan.

19. A method of operating the seat assembly of any preceding embodiment, the method comprising: operating the fan to ventilate the seat; limiting, via said portion of said occupant when said portion is adjacent said surface, sound from the fan to a sound level; sensing, via the sensor, said occupant is not adjacent the surface; and in accordance with sensing that said portion of said occupant is not adjacent the surface, limiting sound from the fan to within a threshold of the sound level by operating the fan at a lower speed.

20. The method of any preceding embodiment, wherein the threshold is 10% or less.

21. An electronic controller configured to implement the method of any preceding embodiment.

22. A non-transitory computer-readable storage medium having a computer program encoded thereon for implementing the method of any preceding embodiment.

In examples, a controller (e.g., the electronic controller 48) may include an electronic controller and/or include an electronic processor, such as a programmable microprocessor and/or microcontroller. In embodiments, a controller may include, for example, an application specific integrated circuit (ASIC) and/or an embedded controller. A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof. The word "exemplary" is used herein to mean "serving as a non-limiting example."

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above. The term "at least one of" in the context of, e.g., "at least one of A, B, and C" or "at least one of A, B, or C" includes only A, only B, only C, or any combination or subset of A, B, and C, including any combination or subset of one or a plurality of A, one or a plurality of B, and one or a plurality of C.

Although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. The term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. The terms "includes," "including." "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

A controller, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods.

Such a system or processor may further be of the type having ROM, RAM, RAM and ROM, and/or a combination of non-volatile and volatile memory so that any software may be stored and yet allow storage and processing of dynamically produced data and/or signals.

An article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A seat assembly, comprising:
a seat;
a fan disposed at least partially in the seat to ventilate the seat;
a sensor configured to sense if a portion of an occupant is adjacent a surface of the seat, wherein the sensor comprises a printed resistive sensor disposed under the surface of the seat and senses pressure of the portion of the occupant against the seat; and
an electronic controller connected to the fan and the sensor;
wherein the electronic controller controls a speed of the fan as a function of the sensed pressure.

2. The seat assembly of claim 1, wherein, in accordance with determining that said portion is not adjacent the surface, the electronic controller operates the fan at a first speed;
in accordance with determining that said portion is adjacent the surface, the electronic controller operates the fan at a second speed; and
the first speed is slower than the second speed.

3. The seat assembly of claim 2, wherein, when said portion of said occupant is adjacent the surface and the fan operates at the second speed, said portion of said occupant limits sound associated with the fan to a sound level; and
in accordance with determining that said portion is not adjacent the surface, the electronic controller operates the fan at the first speed to limit sound associated with the fan to within a threshold of the sound level.

4. The seat assembly of claim 1, wherein the electronic controller controls the speed of the fan according to an output from the sensor to maintain a sound level associated with the fan within a sound range when said portion of said occupant is adjacent the surface and when said portion of said occupant is adjacent said surface.

5. The seat assembly of claim 1, wherein the fan generates sound at a first sound level when operating at a first speed;
the fan generates sound at a second sound level when operating at a second speed;
when said portion of said occupant is adjacent the surface and the fan is operating at the second speed, said portion of said occupant limits the sound generated by the fan to a reduced sound level that is lower than the second sound level;
the first speed is slower than the second speed;
the first sound level corresponds to the reduced sound level; and
in accordance with determining that said portion is adjacent the surface, the electronic controller switches the fan from operating at the first speed to operating at the second speed.

6. The seat assembly of claim 1, wherein the fan is disposed such that said portion of said occupant muffles and/or absorbs sound from the fan when said portion is adjacent the surface.

7. The seat assembly of claim 1, wherein the fan is disposed within 18 inches of an expected ear position of said occupant in a design position.

8. The seat assembly of claim 1, further comprising an occupancy sensor connected to the seat; and
the electronic controller only controls the speed of the fan according to an output from the sensor when the seat is occupied.

9. The seat assembly of claim 1, wherein the sensor comprises a microphone, a camera, and/or a pressure sensor.

10. The seat assembly of claim 1, wherein the fan is disposed at least partially in a top half of a seat back of the seat.

11. The seat assembly of claim 10, wherein the fan is disposed behind and at least partially aligned with the surface.

12. The seat assembly of claim 11, wherein the surface comprises half or less of a total seating surface of the seat back.

13. The seat assembly of claim 1, wherein a position of the sensor corresponds to an expected position of shoulders of said occupant in a design position.

14. The seat assembly of claim 1, wherein the electronic controller is configured to operate the fan at a plurality of first speeds when said occupant is occupying the seat and said portion is not adjacent the surface;
the electronic controller is configured to operate the fan at a plurality of second speeds when said occupant is occupying the seat and said portion is adjacent the surface; and
the plurality of first speeds each correspond to a second speed of the plurality of first speeds to maintain sound levels associated with the fan when said portion of said occupant is adjacent the surface and when said portion of said occupant is not adjacent the surface.

15. The seat assembly of claim 1, wherein said portion of said occupant includes shoulders; and
at least a part of the surface is aligned with an expected position of said shoulders of said occupant in a design position.

16. A method of operating the seat assembly of claim 1, the method comprising operating the fan to maintain a sound level when said portion of said occupant is adjacent the surface and when said portion of said occupant is not adjacent the surface.

17. A method of operating the seat assembly of claim 1, the method comprising:
operating the fan to ventilate the seat;
sensing, via the sensor, whether said portion of said occupant is adjacent the surface; and
in accordance with sensing, via the sensor, that said portion of said occupant is not adjacent the surface, operating the fan at a lower speed to maintain a sound level associated with the fan.

18. A method of operating the seat assembly of claim 1, the method comprising:

operating the fan to ventilate the seat;

limiting, via said portion of said occupant when said portion is adjacent said surface, sound from the fan to a sound level;

sensing, via the sensor, said occupant is not adjacent the surface; and in accordance with sensing that said portion of said occupant is not adjacent the surface, limiting sound from the fan to within a threshold of the sound level by operating the fan at a lower speed.

19. The method of claim 18, wherein the threshold is 10% or less.

* * * * *